United States Patent [19]
Baird et al.

[11] 3,985,606
[45] Oct. 12, 1976

[54] LOW-PRESSURE DEENTRAINMENT EVAPORATOR

[75] Inventors: James L. Baird, Winchester; Max Mendelsohn, Randolph, both of Mass.

[73] Assignee: Artisan Industries Inc., Waltham, Mass.

[22] Filed: Aug. 2, 1974

[21] Appl. No.: 494,078

[52] U.S. Cl. ............................ 159/6 WH; 202/236; 203/89; 159/49
[51] Int. Cl.² ...................... B01D 1/22; B01D 3/08
[58] Field of Search .......... 159/6 W, 6 WH, 49, 31; 202/236; 203/89; 55/401, 402, 403, 400, 404–407

[56] References Cited
UNITED STATES PATENTS

| | | | |
|---|---|---|---|
| 1,694,666 | 12/1928 | Pease | 55/403 |
| 2,213,881 | 9/1940 | Laver | 55/403 X |
| 2,252,982 | 8/1941 | Roberts | 55/403 X |
| 2,927,634 | 3/1960 | Gudheim | 159/6 W |
| 2,973,056 | 2/1961 | Sillers, Jr. | 55/403 |
| 2,994,647 | 8/1961 | Williams et al. | 293/89 X |
| 3,129,132 | 4/1964 | Gudheim | 159/49 |
| 3,234,993 | 2/1966 | Belcher | 159/6 W |
| 3,261,391 | 7/1966 | Gudheim | 159/6 WH |
| 3,357,479 | 12/1967 | Baird et al. | 159/6 WH |

FOREIGN PATENTS OR APPLICATIONS

| | | | |
|---|---|---|---|
| 754,262 | 8/1956 | United Kingdom | 55/403 |

*Primary Examiner*—Jack Sofer
*Attorney, Agent, or Firm*—Richard P. Crowley

[57] ABSTRACT

An improved thin-film rotary evaporator wherein a meshtype deentrainment material having a large amount of free space is secured in the vapor chamber to the rotor shaft for rotation therewith to entrain particles from the vapor phase without a large pressure drop.

19 Claims, 3 Drawing Figures

LOW-PRESSURE DEENTRAINMENT EVAPORATOR

BACKGROUND OF THE INVENTION

Typically in any process, such as evaporation, wherein a fluid material, such as a liquid, is separated into volatile and nonvolatile components, the volatile or vapor-phase components have entrained therein the nonvolatile material as fine liquid or solid droplets or particles. In such processes, the entrained particles are then carried over in the vapor phase, which is undesirable. Various techniques have been used in the past to prevent the carrying over of the entrained particles in the vapor phase.

Where the velocity as measured by an F factor is quite low, then the entrained particles, by their velocity of size or combination, drop out or are easily coalesced out of the vapor phase during the processing. However, to obtain proper F factors, often the equipment size must be altered to provide a low enough flow velocity, or other process and structural modifications undertaken to remove the carry over of the entrained particles in the vapor phase. The F factor referred to is the product of the velocity in feet per second multiplied by the square root of the vapor density in pounds per cubic foot. In a typical batch still design, F factors of 0.1 to 0.2 are usually employed, while in centrifugal-type vapor separators, F factors from about 2 to as high as 3.0 are employed in designing the apparatus.

In thin-film-type evaporation apparatuses and processes, a fluid feed material, such as a solution, emulsion, slurry, liquid, suspension or other mixture, is placed onto a heat-exchange surface in thin-film form to obtain a volatile component; that is, a vapor and a nonvolatile component, typically a liquid, solid like powder or salt, a slurry or a viscous material. In many processes, evaporation typically occurs under subatmospheric pressures, and, therefore, it is most desirable to maintain a low-pressure drop within the apparatus. Rotary-type thin-film evaporators, by themselves, are often good entrainment separators, since the rotation of the rotor blades tends to throw the resulting vapor against the interior chamber walls. However, particles entrained in the vapor are still contained in the volatile vapor phase typically under a (100) parts per million.

Entrained particles in the vapor phase of a thin-film evaporator are often removed through the use of a deentrainment type knitted or woven wire mesh-type packing or other packing material which is employed in the vapor outlet system, and prior to the condensation of the vapor.

In addition, in the past, some thin-film evaporators have employed rotating solid disc elements secured to the rotor shaft on which the rotor blades of the thin-film are secured. The disc elements rotating with the rotor shaft are secured in the vapor chamber of the apparatus between the product outlet and the vapor outlet. The disc elements have been composed of a solid plate extending across the cross-sectional area of the vapor chamber, and into close communication with the interior chamber wall. The disc elements have been used in pairs, each one spaced slightly apart from the other along the rotor shaft. In theory, the vapor phase containing the entrained particles passing around and over the rotating surface of the disc elements permits the entrained particles to be impinged on the surface of the disc elements, and then thrown by the centrifugal force of the discs to the inner interior wall of the vapor chamber. The pair of disc elements in essence increases the flow path of the vapor to serve as an entrainment technique to aid in the removal of entrained liquid of solid particles in the vapor phase.

The use of a pair of disc elements or stationary mesh-type material, while satisfactory in some processes and apparatuses, often creates a substantial and undesirable pressure drop; for example, for 4 millimeters of mercury, typically from 4 to 8 millimeters, in an evaporator where it is desired to operate below about 10 millimeters of mercury. In addition, the pair of rotating discs has been also unsatisfactory in that the entrained material thrown to the wall opposite the edges of the discs has a tendency to be reentrained in the vapor passing over the disc elements. Therefore, it is most desirable to provide in a thin-film-type rotor blade apparatus an effective, efficient and inexpensive means to remove entrained particles from the vapor phase without a correspondingly large pressure drop in relationship to the operating pressure of the apparatus and process.

SUMMARY OF THE INVENTION

Our invention relates to a new and improved thin-film fluid-processing apparatus of the rotary thin-film type which includes a new and effective means of removing entrained liquid or solid particles from the vapor phase, to a method of manufacturing such apparatus and to the method of removing the entrained particles from the vapor phase.

In particular, our invention relates to a rotary thin-film-type evaporator containing a vapor chamber wherein the particles entrained in the volatile vapor phase in a vapor chamber are removed through the employment of a deentrainment means of an open-type wire mesh material extending across the cross-sectional area of the vapor chamber and rotating about the rotor of the evaporator.

Our invention concerns a fluid-processing apparatus evaporator of the rotary thin-film type which comprises: a process chamber having an interior wall surface defining a surface of revolution; a vapor chamber within the processing chamber; a rotor; a means to rotate the rotor; a plurality of rotor blades secured to the rotor for rotation therewith, the blades generally radially arranged from the rotor and extending into a close relationship on the surface of revolution to provide a thin film of material on the surface of revolution; a feed inlet for the introduction of material to be processed; a product outlet for the removal of processed material; means to heat the processed material in the processing chamber to provide a vapor; a vapor outlet in the vapor chamber for the withdrawal of vapor; and vapor deentrainment means in the vapor chamber which comprises vapor deentrainment material comprising an open mesh-type material extending across a cross-sectional substantial portion of the vapor chamber, and means to rotate the mesh-type material about the rotor in the vapor chamber.

In one preferred embodiment of our invention, the vapor deentrainment material comprises an open mesh-like material, wherein the material is secured to the rotor for rotation thereabout. Also typically, in another embodiment, the entrainment means includes a collar element peripherally surrounding the deentrainment material and spaced slightly apart from the wall of the vapor chamber. The collar element is adapted to receive and collect thereon on its internal surface the particles entrained by the mesh material, and to discharge the particles away from the vapor outlet. The collar element may be generally cylindrical, but more typically conical in form, so that the collar element on rotation will discharge the entrainment material back toward the direction of feed flow; that is, back into the rotor blades, so that the entrainment particles will not collect on the wall of the vapor chamber or enter directly the product outlet.

Our invention also comprises a method of employing a thin-film-type evaporator having a closed chamber and with a plurality of rotor blades secured to a central rotor for rotation therewith in the chamber, with the chamber including a vapor chamber adapted to receive a vapor phase, which method comprises: placing a thin film of the material to be evaporated onto the interior wall surface of a closed processing chamber through the rotating rotor blades in the chamber; evaporating the material in the thin-film form into a volatile component and into a nonvolatile component; removing the nonvolatile component from the processing chamber, and removing the volatile component from the processing chamber, the improvement which comprises: passing the volatile component containing entrained particles of the nonvolatile component through a rotating open mesh-type entrainment material, rotating about the rotor shaft; coalescing the entrained particles from the volatile component onto the mesh material; and directing the coalesced particles away from the outlet from which the volatile components are removed from the processing chamber. Preferably, the method includes collecting the entrained particles on the outer periphery of the deentrainment means and directing the particles back toward the rotating rotor blades and generally counter-current into the flow path of the thin-film material. The volatile components produced by the method are typically a vapor which may contain a plurality of different vapor components, while the feed material employed in the method and the nonvolatile components produced may comprise a wide variety of materials, such as slurries, solutions, emulsions, or other forms, for the feed, and in addition, include solid, salt or wet powder form for the product outlet material.

Our invention may be usefully employed in a wide variety of thin-film-type evaporators, such as in straight-sided or cylindrical type of evaporators, as well as in tapered vapor evaporators. Our invention may be employed in those evaporators, regardless of position, either horizontal or vertical, where the flow of the feed and vapor is either cocurrent or countercurrent.

The deentrainment means employed in our invention may comprise a wide variety of entrainment-type materials. Typical mesh-type materials for use in our invention are illustrated or described in U.S. Pat. Nos. 2,274,684; 2,327,184; 2,334,263; 2,390,200; 2,755,079; 3,034,655; and 3,339,351. Generally, such material should present a large amount of open or free volume or space; for example, over 90%, so as to prevent any large pressure drops in use. Typical materials which may be employed would include fibers and wire mesh-type materials in woven or nonwoven form, such as crimped or knitted form. In one preferred embodiment, the mesh-type material is secured to the rotor in the vapor chamber for rotation therewith, and includes an outer peripheral collar element which is spaced slightly apart from the interior wall of the vapor chamber, and which is also secured to the rotor shaft for rotation therewith along with the mesh material. The collar element serves to collect the material, and to direct the material back toward the processing section away from the product outlet or vapor outlet.

Our invention in use collects entrained particles in the volatile or vapor phase without significantly increasing the pressure drop. Our invention is particularly applicable to thin-film evaporators operating under subatmospheric pressures, and particularly subatmospheric pressures wherein prior art entrainment means cause substantial pressure drops. Typically, the mesh employed is composed of fine diameter fibers or wire; for example, for about 1/10th to 10 mils in diameter, but more particularly, 0.5 to 6 mils in diameter, which is woven, knitted, crimped or otherwise formed into an interwoven mesh-like form, and which has a high free area or free space of over 97%, and often over 99+%, in free or open area. The mesh-like material may be employed in various thicknesses; for example, may range from 1 to 12 inches, but more typically, is used from about 2 to 8 inches in depth, and generally extends to cover substantially all of the cross-section area of the vapor chamber.

In another embodiment of our invention, not only are the entrained particles in a vapor or volatile component coalesced by the rotating mesh-like material of the entrainment means, but in addition, the entrained particles on the mesh material are then collected through centrifugal force by a collection means, such as a collar element, and then directed back into the rotor blades or to the walls of the processing chamber. Thus, our invention serves as an effective means to coalesce entrained particles in a vapor phase, as well as to discharge the coalesced particles for further processing in the evaporator.

Our apparatus and method are particularly effective and have numerous advantages over prior art apparatuses and methods in that the rotation of the mesh-type material, increases significantly the removal of particles due to the rotation of the mesh-type material. In addition, the large open space of the mesh-type material provides for a significantly low-pressure drop as compared to conventional stationary mesh-type separators for the same degree of efficiency. Although normally the rotating blades of a thin-film evaporator are, in themselves, an deentrainment means, and while other rotating solid disc materials have been employed in vapor chambers, such devices have significantly increased pressure drops as compared to our device. For example, in employing mesh-type fine wire entrainment means rotating in the vapor chamber, pressure drops of less than 2 mm of mercury, and typically less than 1 mm, with mesh-type depths of 2 to 4 inches are obtained in subatmospheric pressures of less than 10 mm of mercury. Our evaporator permits the use of F factors of 0.05 to 3 or better; for example, our evaporator typically has rotor blades which, depending on the evaporator size and top speed, are rotated at greater than 500 rpm; e.g., 800 to 2000 rpm.

The material entrained in a volatile component or in the vapor phase varies in particular droplet size and concentration, depending on various factors connected with the material to be processed in the thin-film evaporator; e.g., usually over 1 micron; e.g., from 0.1 to 10 microns; however, material entrained in the volatile component not only comprises fine liquid droplets, but also solid particles, such as salts, powder materials and the like.

Our invention will be described for the purpose of illustration only in connection with a horizontally axised rotary wiped thin-film evaporator having a generally cylindrical processing chamber, wherein the volatile component is generated during a co-current processing operation; i.e., following the same direction asthe product with respect to the feed material.

DESCRIPTION OF THE EMBODIMENTS

Figure 1:
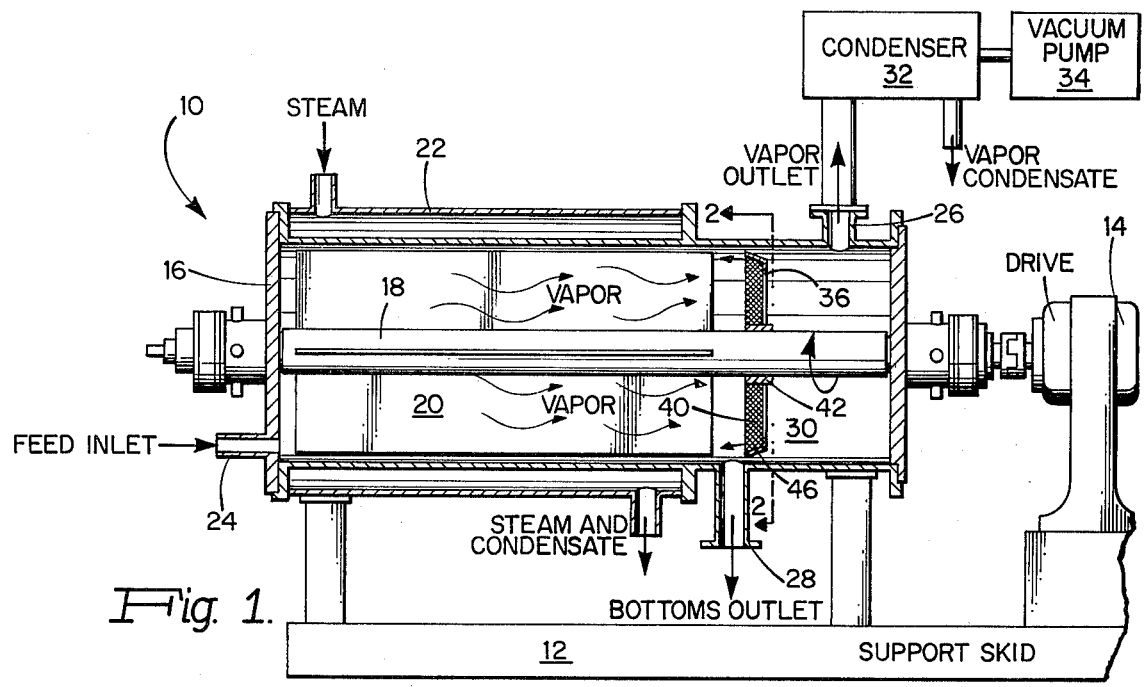
FIG. 1 is a schematic illustration of a horizontally axised cylindrical rotary thin-film evaporator of our invention.

A horizontal thin-film-type evaporator 10 is shown mounted on a support skid 12, the evaporator 10 including a shell 16, a centrally disposed rotor shaft 18 passing through the shell, the rotor shaft adapted for rotation through a drive motor 14. The rotor shaft 18 includes a plurality of rotor blades 20 secured thereto, and adapted for movement therewith shown with four blades, but the blades may vary and typically range from 2 to 8 blades. The blades are generally radially and coaxially arranged from the rotor and extend into a close thin-film-forming relationship with the interior wall of the shell 16, so that on rotation, a thin film of feed material is placed onto the interior wall surface of the shell 16 in that portion of the shell defined by the surface of revolution of the blades and known as the processing section.

The shell 16 is surrounded by a steam or temperature control jacket 22 into which steam is introduced and from which steam and condensate are removed, the purpose of the jacket being to provide heat for the evaporation of the feed material to be processed. The apparatus evaporator 10 includes a feed inlet 24 for the introduction of a material to be evaporated and processed through the apparatus illustrated as a coaxial feed inlet, a vapor outlet 26 through which the volatile component; that is, the vapor phase, produced by the evaporation is withdrawn, and a bottoms outlet 28 by which the nonvolatile component or product is withdrawn.

The shell 16 is composed of a processing section comprising that section occupied by the rotor blades, and a vapor chamber 30. Typically in operation, the evaporator will be combined with a condenser 32 to provide for full or partial condensation of one or all components of the vapor phase, and a vacuum means, such as a vacuum pump 34, wherein the evaporator and condenser are operated under subatmospheric conditions.

Figure 2:
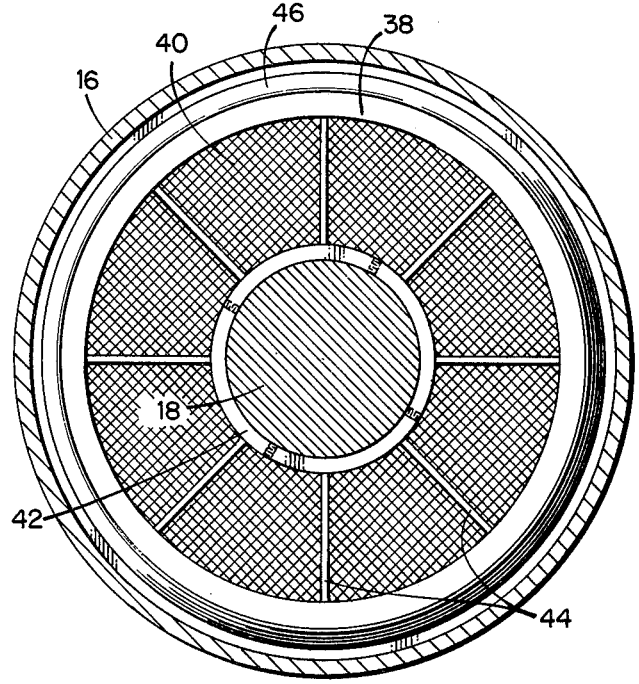
FIG. 2 is a sectional view of FIG. 1 taken along the lines 2—2 of FIG. 1.
Figure 3:
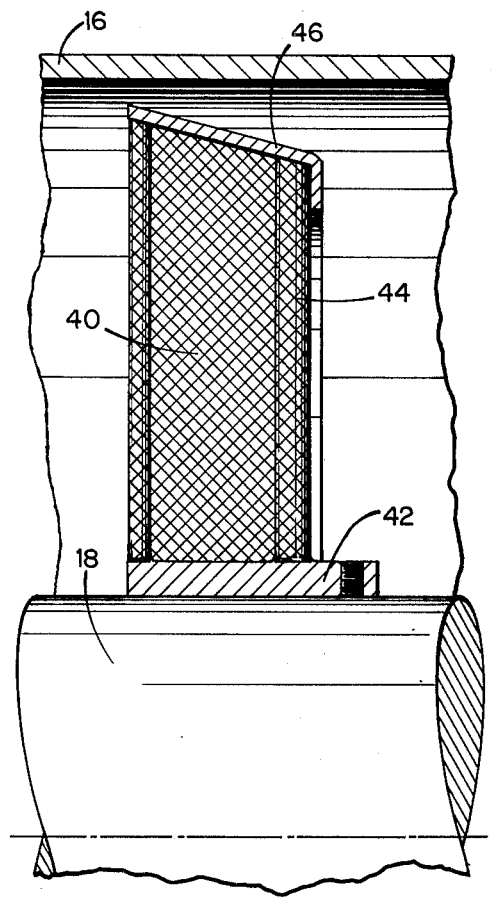
FIG. 3 is an enlarged fragmentary cross-sectional view of a portion of the mesh-type entrainment means shown in FIG. 1.

Referring now in particular to FIGS. 1, 2 and 3 which show a rotor hub 42 secured to the rotor 18 by set screws, the hub adapted for rotation with the rotor 18, a series of spokes 44 secured to and extending radially from the rotor hub 42 are secured at the outer edge ot a peripheral collar element 46, which collar element has a continuous solid surface inclined inwardly like a truncated cone to provide a flow vector component of any material thereon through the centrifugal force back toward the rotor blades 20.

The entrainment means 36 comprises an entrainment cage 38 in which is placed a woven or knitted metal fine diameter wire mesh having an open area greater than about 98%, the mesh adapted to provide for coalescence of any particles entrained in the vapor phase which are discharged from the processing section of the evaporator 10.

In operation, the feed material in introduced into the feed inlet, and is placed in thin-film form onto the interior walls of the shell in the processing chamber by the rotation of the rotor blades 20 through drive 14. The feed may be a liquid solution organic resin or monomer-containing solvent solution from which the solvent is to be evaporated, or an aqueous salt-containing solution from which salts or powders are to be concentrated, or other material as desired. As the feed material moves from the inlet 24 to the bottoms outlet 28, it is heated, and a volatile component or a vapor phase formed whose movement is schematically illustrated more particularly by the directional arrow lines in FIG. 1 toward the vapor chamber and the entrainment separator 36. The evaporator 10 and condenser 32 are under subatmospheric pressure, such as, for example, in the processing of ethylene imine monomer under 10 mm mercury pressure by the vacuum pump 34.

The woven wire mesh 40 is secured in the cage 38 and the cage is adapted for rotation about the rotor shaft 18. As the vapor phase with the entrained particles passes through the rotated entrainment separator means 36, the fine liquid or solid droplets entrained in the vapor phase are coalesced and condensed on the wire mesh 40. The entrained droplets are then directed by the centrifugal force of the rotating mesh 40 toward the inner surface of the collecting collar element 46. The truncated collar element is shaped so as to discharge the coalesced fine droplets collecting in the collar back toward the rotor blades as schematically illustrated by the arrows in FIG. 1 adjacent the collar element. The vapor phase passing through the entrainment means is thus passed through the vapor outlet 26 into the condenser 32 substantially free of deentrainment liquid or solid particles. The deentrainment separator illustrated permits the efficient collection of entrained particles from the vapor phase without a substantial pressure drop due to the open spaces of the deentrainment means and efficiency of rotating the entrainment means about the rotor shaft.

Our apparatus has been described for the purpose of illustration only wherein the mesh-type material 40 has been secured to the rotor shaft for rotation with the rotor shaft. However, it is recognized that in some cases, it may be desirable to rotate the mesh-like material 40 at a greater or slower speed than the rotation of the rotor shaft. Consequently, our invention includes the rotation separately of the deentrainment means at a speed other than the speed of the rotor shaft; for example, through extending a separate collar hub about the rotor shaft and using the same or a separate drive means to drive the hub.

Our invention has also been illustrated employing a fine diameter wire-type woven mesh means; however, the type and nature of the entrainment material employed in the entrainment means may vary. For example, the mesh-type material may comprise one or more separate layers of separate mesh material, while, if desired, onw or more different cages may be secured to the rotor shaft for movement therewith at the same or different speeds, either cocurrent or with said plurality entrainment means moving in the same direction or in opposing rotary directions.

Furthermore, our collar element which coalesces liquid droplets back into the processing chamber of the evaporator has been shown as a truncated cone as the generally most economical and preferred embodiment. However, it is recognized that the collar element may be of other form as desired to remove particles which are cast thereon due to centrifugal force from the mesh-type material.

In the evaporator as described, the evaporator may be employed for the evaporation of an ethylene imine monomer solvent solution for the recovery of a pure monomer from the outlet and the removal of solvents containing entrained liquid monomer therefrom. However, our evaporator may also be usefully employed in the evaporation of fluid solutions; for example, recovery of wet powders, slurries or salts, from an aqueous slurry emulsion or solution thereof, wherein the salt or powder material may be entrained in the vapor phase.

Although our apparatus has been described in particular with reference to evaporation or concentration of materials, it may also be used for any type of processing operation, such as drying, fractionating, distillation, sublimation and chemical reactions wherein it is desired to remove effectively entrained particles, such as solid or liquid particles, from a vapor phase without substantial pressure drops, particularly in subatmospheric operations.

What we claim is:

1. In a method of processing fluid material in a rotary-wiped thin-film-type evaporator apparatus which comprises a plurality of rotor blades secured to a rotor within a processing chamber within a closed chamber, and which includes a vapor chamber, a vapor outlet, a feed inlet at one end and a product outlet remotely spaced downstream from the feed inlet, which method comprises: placing a thin film of said feed material to be heated onto the interior wall of the closed chamber which wall is a surface of revolution through the rotation of the rotor blades by the rotor; heating the thin film on the interior wall of the chamber as it moves from the feed inlet to the product outlet of the apparatus to provide a nonvolatile component and a volatile vapor component having entrained particles of the nonvolatile component therein; removing the nonvolatile vapor component from the product outlet; and removing the volatile component from the vapor outlet, the improvement which comprises:
    a. passing the volatile vapor component containing entrained particles of the nonvolatile component therein, after removal of the nonvolatile component from the product outlet and prior to removal of the volatile component from the vapor outlet, through a pad of deentraining open mesh-type material having an axial depth of about 1 to 12 inches and characterized by about over 90% free space while rotating the mesh material axially about the rotor, and substantially perpendicular to the rotor axis, the voltile vapor component having the entrained nonvolatile components impinging substantially perpendicularly to the mesh-type material to provide for the collection of the entrained components on the mesh-type material, and to permit the deentrained volatile component to pass axially through the mesh-type material to the vapor outlet; and
    b. collecting the deentrained particles, by virtue of centrifugal force, from the mesh-type material onto an inner collecting surface about the outer periphery of the mesh-type material, the surface closely spaced from the surface of revolution and secured to the material for rotation therewith, and directing said collected particles in a direction away from the vapor outlet.

2. The method of claim 1 which includes positioning the inner collecting surface at an angle relative to the axis of the rotor, so as to provide that the collected material thereon moves toward the rotor blades and is discharged onto the interior wall of the vapor chamber.

3. The method of claim 1 which includes passing the vapor phase with particles therein axially through a rotating pad of open mesh-type material having an axial depth of about 2 to 8 inches, and having over about 97% open space.

4. The method of claim 1 which includes maintaining the vapor chamber under subatmospheric pressure conditions and condensing the vapor from the vapor outlet.

5. The method of claim 1 which includes introducing an aqueous-salt-containing liquid feed material into the feed inlet, discharging a salt-containing product from the product outlet, and passing the vapor from the feed material through the rotating mesh-type material to entrain particles thereon.

6. The method of claim 1 which includes introducing an ethylene imine monomer-solvent solution into the feed inlet, discharging an ethylene imine monomer from the product outlet, and passing the solvent vapor through the rotating mesh-type material to entrain liquid particles thereon while maintaining the processing chamber under subatmospheric conditions.

7. The method of claim 1 which includes securing the mesh-type material for rotation with the rotor.

8. The method of claim 1 which includes rotating the mesh-type material at a different speed than the rotating speed of the rotor.

9. The method of claim 1 which includes passing the vapor phase axially through a pad of open, woven or knitted metal wire mesh material having a wire diameter of from about 0.1 to 1 millimeter, the pad having over about 90% open space.

10. The method of claim 1 which includes maintaining the processing chamber under a subatmospheric pressure of less than about 10 millimeters of mercury, and wherein the mesh-type entraining material has a pressure drop of less than 2 millimeters of mercury.

11. The method of claim 1 wherein the nonvolatile particles entrained in the volatile vapor component have a particle size of from about 0.1 to 10 microns.

12. The method of claim 1 which includes:
    a. providing a peripheral collar element closely spaced to, but apart from, the surface of revolution, the collar element being a truncated collar element with open bases, with the smaller base positioned toward the vapor outlet; and
    b. securing the collar element to the rotor for rotation therewith and with the pad of mesh-type material.

13. A fluid-processing apparatus of the rotary-wiped thin-film type which comprises in combination:
    a. a process chamber having an interior wall surface defining a surface of revolution;
    b. a vapor chamber within the processing chamber and at one end thereof;

c. a coaxial rotor in the processing chamber;
d. means to rotate the rotor;
e. a plurality of rotor blades secured to the rotor for rotation therewith, the blades generally radially and axially arranged from the rotor and extending into a close relationship with the surface of revolution to provide a thin film of material on the surface of revolution;
f. a feed inlet for the introduction of material to be processed;
g. a product outlet remotely spaced from the feed inlet closely downstream from the downstream ends of the rotor blades for the removal of processed material;
h. means to heat the material processed in the processing chamber to provide a vapor from the material, said vapor having particles entrained therein;
i. a vapor outlet in the vapor chamber for the withdrawal of vapor; and
j. particle deentrainment means in the vapor chamber between the vapor outlet and the product outlet which comprises
   i. a pad of open mesh-type material having an axial depth of from about 1 to 12 inches and over about 90% of free open space, and which extends transversely across a substantial cross-sectional portion of the vapor chamber and substantially perpendicular to the rotor axis, which mesh material provides for the collection of particles from the vapor which flows substantially axially through the processing chamber and impinges substantially perpendicularly to the mesh-type material, and which permits the axial passage of the particle-free vapor to the vapor outlet,
   ii. a peripheral collar element means surrounding the mesh-type material spaced apart from, but in particle flow communication with, the surface of revolution, said element adapted, by virtue of centrifugal force, to collect on the inner surface thereof particles removed from the vapor by the mesh-type material, and said collar element formed to discharge the particles away from the vapor outlet, which provides for the collection onto the rotating mesh-type material of entrained particles from the vapor and the displacement of the collected particles toward the internal wall of the vapor chamber by the centrifugal force of the rotating mesh-type material, and
   iii. means to rotate the mesh-type material with the collar element about the rotor in the vapor chamber.

14. The apparatus of claim 13 wherein the particle deentrainment material comprises a woven or knitted wire material.

15. The apparatus of claim 13 wherein the collar element is a truncated conical element with open bases, the smaller diameter end of the element positioned toward the vapor chamber outlet.

16. The apparatus of claim 13 wherein the entrainment means includes:
a. a hub secured to the rotor for rotation therewith;
b. a collar element spaced apart from, but in close communication with, the surface of revolution;
c. a plurality of thin radially extending frame elements securing the hub to the collar element for rotation therewith; and
d. the open mesh-type entrainment material composed of a bed of metal wire mesh material having a depth of about 1 to 12 inches, and characterized by about 97% open space, the said material secured between the hub and the collar elements.

17. The apparatus of claim 13 wherein the mesh-type material comprises fine diameter wire of from about 0.1 to 10 mils in diameter, and has an open free space of greater than about 98%.

18. The apparatus of claim 13 which includes in combination with the apparatus a means to place the process chamber under subatmospheric pressure, and a means to condense the vapor passed through the deentrainment means.

19. A liquid processing apparatus of the rotary-wiped thin-film type which comprises in combination:
a. a process chamber having an interior surface defining a surface of revolution;
b. a vapor chamber within the processing chamber downstream of the rotor blades;
c. a coaxial rotor;
d. means to rotate the rotor;
e. a plurality of blades secured to the rotor for rotation therewithin, the blades generally radially and axially arranged from the rotor and extending into close proximity to the surface of revolution to provide a thin film of liquid material on the surface of revolution;
f. a feed inlet for the introduction of said liquid to be processed;
g. a product outlet remotely spaced from the feed inlet closely downstream from the downstream ends of the rotor blades for the removal of processed material;
h. means to heat the material processed in the chamber to provide a vapor containing entrained particles;
i. a vapor outlet in the vapor chamber for the withdrawal of vapor; and
j. particle deentrainment means in the vapor chamber which comprises
   i. a pad of open mesh-type particle deentrainment material having an axial depth of from 1 to 12 inches and a free open space of over 90% extending transversely across a substantial cross-sectional portion of the vapor chamber downstream of the rotor blades with respect to vapor flow, and which permits the passage of vapor axially therethrough and to the vapor outlet,
   ii. a peripheral collar element spaced from, but in particle flow communication with, the surface of revolution, said element adapted, by virtue of centrifugal force, to collect on the inner surface thereof particles removed from the vapor by the mesh-type material, and to discharge the particles away from the vapor outlet, said collar element being a truncated conical element with open bases, the smaller of which is positioned toward the vapor outlet, and
   iii. means to rotate the mesh-type material about the rotor axis comprising a hub and a plurality of thin radially extending frame elements securing the hub to the collar element to rotate therewith.

* * * * *